(No Model.)

A. S. SHERMAN.
FEED BOX FOR POULTRY.

No. 415,742. Patented Nov. 26, 1889.

WITNESSES:
Anson M. Lyman
Henry E. Payan

INVENTOR:
Algernon S. Sherman
by Chas. F. Perkins
his atty.

UNITED STATES PATENT OFFICE.

ALGERNON S. SHERMAN, OF PLYMPTON, MASSACHUSETTS.

FEED-BOX FOR POULTRY.

SPECIFICATION forming part of Letters Patent No. 415,742, dated November 26, 1889.

Application filed February 13, 1888. Serial No. 263,900. (No model.)

*To all whom it may concern:*

Be it known that I, ALGERNON S. SHERMAN, of Plympton, in the county of Plymouth and State of Massachusetts, have made an invention of certain Improvements in Feed-Boxes for Poultry; and I do hereby declare that the following is a full, clear, and exact description and specification of the same.

My invention consists of an improvement in feed boxes or chests for poultry.

Figure 1:
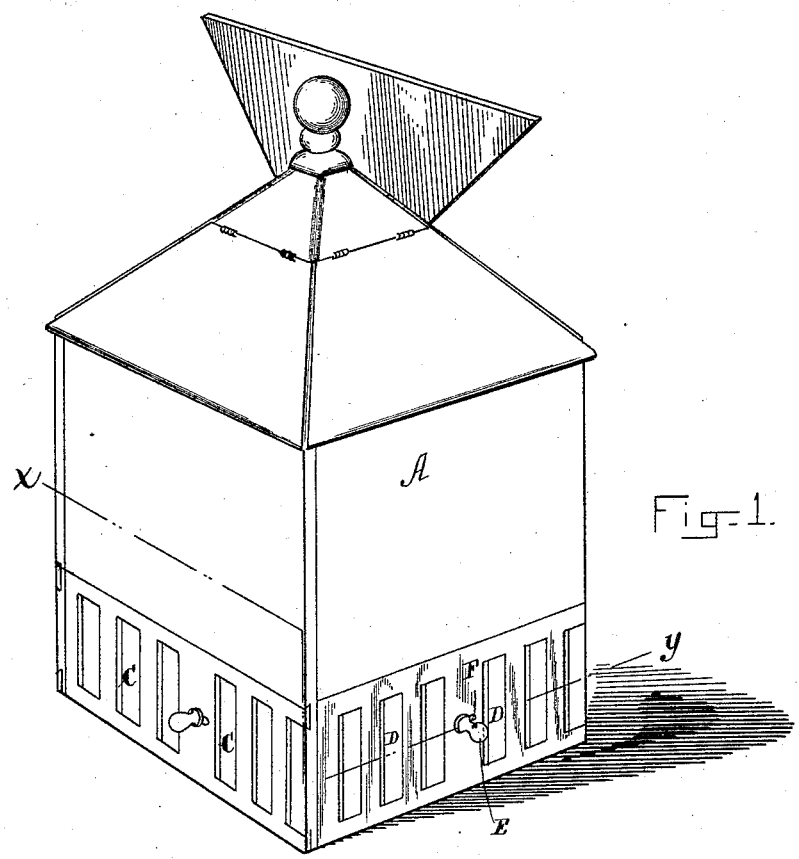
Figure 2:
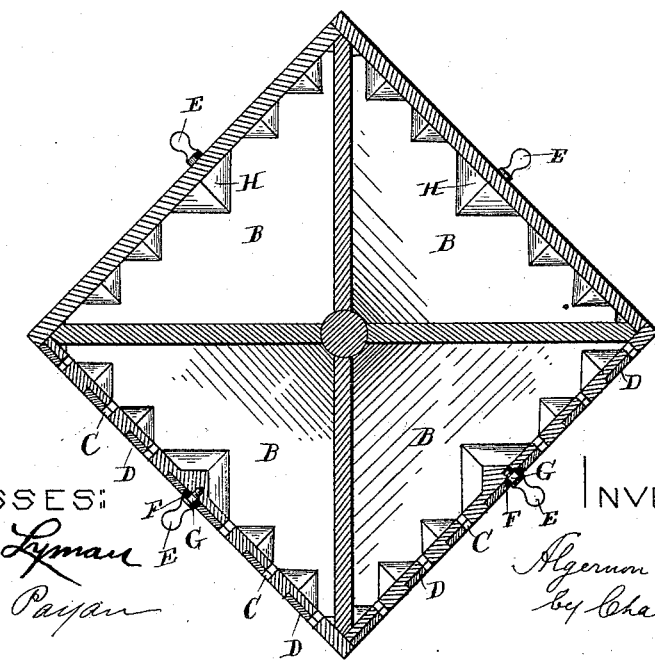

In the drawings, Figure 1 is a perspective view, and Fig. 2 a horizontal section through the line X Y.

The object of my invention is to provide a feed-box which does not require a frequent supply of food, will prevent waste, and is a protection against rats and other animals.

A represents a box or chest of any size which may be required, which is provided with one or more apartments B, according to the number or kinds of feed designed to be used. The bottom of each apartment is inclined to insure the delivery of the feed to the openings in front. Each apartment is provided with a series of vertical openings C wide enough to admit the bill of a fowl. Each of the apartments is provided with a cover, which may be locked or secured in any manner, so that it cannot be raised by rats or other animals. These openings C may be partially closed by means of a slide-plate D, having openings therein and operating like the holes and slide-plate which regulate the draft in a stove or range. The slide-plate D is provided with a bolt E, which extends through the box and slides in a horizontal slot F, provided for it. The bolt E is provided with a nut G for the purpose of securely holding the slide-plate D in any given position. The object of the openings C and slide-plate D is to regulate the discharge of the feed from the box. If the feed is coarse, like whole corn, the openings C should not be so nearly closed as in the use of cracked corn or oats, wheat, and similar grain.

When the slide-plate D is properly adjusted, the feed will fall in the openings C and clog until released by the fowls, which will strike it with their bills, dislodging it, and then picking it from the ground or floor as fast as it falls. I have observed from long practical experience that the fowl will invariably pick the grain from the ground as quickly as it falls before pecking again at the openings of the box. By filling the apartments B in a large box a continuous supply of feed is furnished for a long time and a variety afforded.

The bottom of each apartment is provided with triangular-shaped pieces H for the purpose of guiding the feed directly to the openings C and preventing it from becoming lodged. The box when in use should be placed on a pedestal sufficiently high to enable the fowl to reach it when standing on the ground, and out of the reach of rats and other vermin.

What I claim as my invention is—

1. A feed box or chest containing one or more compartments B, each compartment having one or more narrow openings C near the bottom, the bottom inclining upwardly from the openings C, and the guide-pieces H inclined so as to direct the feed in a line with the openings C, all so arranged as to deliver the feed into the openings C, substantially as described.

2. A feed box or chest containing one or more compartments B, each compartment having one or more narrow openings C near the bottom, the bottom inclining upwardly from the openings C, and the guide-pieces H inclined so as to direct the feed in a line with the openings C, all so arranged as to deliver the feed into the openings C, in combination with the sliding plate D, adapted to regulate the width of the openings C, substantially as described.

ALGERNON S. SHERMAN.

Witnesses:
ANSON M. LYMAN,
CHAS. F. PERKINS.